Fig.1 Saccharification type in neutral

Assayed by iodine method
Substrate: soluble starch

Fig. 2 Saccharification type in acidic

Assayed by iodine method
Substrate: soluble starch

Fig. 3 Type of proteolytic action in acidic

Assayed by formol titration method
Substrate: milk casein

Fig. 4 Type of proteolytic action in acidic
Assayed by formol titration method
Substrate: milk casein INVENTORS:
Ichiro Tanaka
Takaaki Yanagisawa
Jiro Sawada
Yutaka Misawa
Hiroshi Nakayoshi
ATTORNEYS Fig. 5 Proteolytic power in acid. due to assay for casein digestive power, J. P VI.

Fig. 6 Proteolytic power in neutral medium, due to assay for casein digestive power, J. P VI.

INVENTORS:
Ichiro Tanaka
Takaaki Yanagisawa
Jiro Sawada
Yutaka Misawa
Hiroshi Nakayoshi

ATTORNEYS

Fig. 7 pH-activity curve of protease
Assayed by formol titration method
Substrate: milk casein

United States Patent Office 3,063,911
Patented Nov. 13, 1962

3,063,911
ACID-STABLE DIGESTIVE ENZYME PREPARATION AND PROCESS OF MAKING SAME
Ichiro Tanaka, Nakanoku, Tokyo, Takaaki Yanagisawa and Jiro Sawada, Suginamiku, Tokyo, Yutaka Misawa, Kawagoe Saitama, and Hiroshi Nakayoshi, Chiba Chiba, Japan, assignors to Taisho Pharmaceutical Co., Ltd., Tokyo, Japan, a corporation of Japan
Filed Apr. 3, 1961, Ser. No. 100,000
4 Claims. (Cl. 195—62)

Our invention relates to an acid-stable digestive enzyme and to the process of preparing the same from a mould.

It is the object of our invention to obtain the acid-stable digestive enzymes which digest protein and starch in the stomach without antacids.

This application is a continuation in part of our application Serial No. 845,010, filed October 7, 1959. Pancreatin and malt diastase have usually been administered as a digestive remedy. Pancreatic trypsin and amylase are highly effective in neutral and slightly alkaline medium, but these activities are greatly destroyed by contacting with gastric acid. Reactivation of these enzymes in the bowel is not recognized (K. Okazaki: Yakuzaigaku (Japan), vol. 16, p. 15 (1957); Chem. Abst., vol. 51, p. 9738 (1957)). Malt diastase is more sensitive to gastric acid. Therefore, they are taken together with an antacid such as sodium bicarbonate.

Although many favorable properties of antacids are recognized by some physicians, the side effects of an antacid, such as involving acid rebound, alkalosis, constipation, diarrhea, depression of gastric germicidal action, etc., have also been discussed among others (C. Fuchs: Drug and Cosmetic Industry, June, p. 692 (1949)). The antacid is not suitable for those patients with hypertension, kidney disturbance, etc., who are not allowed to take sodium salt. From this point of view, we carried out research for making acidstable proteolytic and amylolytic enzymes.

The first step in the research was the screening of fungi, which produce acid-stable digestive enzyme, from nature. Fungi Aspergilli have long been employed in manufacturing sake, shochu (Japanese distilled wine), miso (bean paste), and shoyu (soy) in Japan, and among them, some strains, which produce the strong proteolytic or amylolytic enzymes, were known. The fungi Aspergillus oryzae have been utilized for manufacturing digestive preparations ever since Dr. Takamine had made "Takadiastase." It has been recognized that the optimum pH for these enzymes lies in the range of pH 5–7. Consequently, acid-stable enzymes for our purpose are not obtained from these known fungi. In order to isolate fungi producing acid-stable enzymes, we propagated wild fungi at 30° C. on koji-agar culture medium adjusting pH to 2–3, and we isolated many pure strains from wild fungi. Among these strains we discovered one new strain belonging to the Aspergilli which was obtained from the atmosphere in the suburbs of Tokyo city near River Tama which serves satisfactorily our purpose through the test of their amylolytic and proteolytic activities.

METHOD FOR THE ISOLATION OF FUNGI

Outdoor or indoor air is principally selected for the material, from which desired fungi are isolated preferably. Vegetable, fruits, bread and other foods are as well as selected for the material.

Petri-dishes, in which koji agar being adjusted at pH 3.0 with hydrochloric acid is placed, are exposed in air for some time without covers, and then they are cultured at 30° C. in a thermostat.

The fungi which have grown up and belong to genus Aspergillus are separated and cultured purely in conventional way.

The fungi attaching or sprung up on fruits or vegetables are also cultured in same medium at 30° C., and the fungi which have grown up and belong to genus Aspergillus are cultured on streak culture medium or koji agar and separated purely.

Among these fungi thus obtained, there are 71 black strains, 64 yellow-green strains, 8 yellow-brown strains and one strain belonging to genus Penicillium, and the number of total strains is 167.

METHOD FOR THE SELECTION OF FUNGI PRODUCING ACID-PROTEASE

Place 0.1 gm. of Hammarsten casein in a 50 cc. measured flask, add 30 cc. of water with shaking to make uniform suspension. To this solution, add 1 cc. of 0.1 N-NaOH shaking at 40° C. to dissolve casein, and add sufficient amount of water to make up total volume 50 cc. To a 5 cc. of this solution thus prepared, add 3 cc. of McIlvaine buffer solution (pH 3.0) and 2 cc. of water. This is mixed with a portion of 0.1 cc. of enzyme solution and used for the test solution.

The enzyme solution is prepared as follows: inoculate each strain on koji culture medium consisting of 5 gm. of wheat-bran, 1 gm. of rice-hulls and 3 cc. of water, and culture it at 30° C. for 3 days, infuse with 30 cc. of water and stand for one hour, then centrifuge; a 0.1 cc. of limpid solution thus obtained is tested as the enzyme solution.

The mixture solution for the test above mentioned is kept at 40° C. for one hour with shaking and then is added 0.1 N-NaOH.

The transparency of solution is dependent upon the protease-activity. An opalescence in transparency is caused by undigested protein. The transparency below slight opalescence means complete digestion. And in this way, the protease-activity is judged by contrasting transparency of solution with a standard.

An enzyme solution of Aspergillus niger NI, whose acid-protease activity is stronger than that of Aspergillus awamori No. IAMR-3523 by Yoshida, is used as the standard. And tested strains were divided in 3 groups; A-group is stronger, B-group is equal to and C-group is less than the standard.

Results of about 70 strains among 167 are shown in Table I.

Table I.—Selection of Fungi Producing Acid-Protease (pH 3.0, 40° C., 1 Hr.)

| Strain No. | Color of colony | Genus | Classification by activity [1] |
|---|---|---|---|
| Asp. niger (standard strain) | Black | Asp. niger NI | B |
| Asp. awamori | Blackish brown | Asp. awamori IAM [2] R-3523 | B |
| 2 | ----do---- | Aspergillus sp | B |
| 3 | ----do---- | ----do---- | C |
| 4 | ----do---- | ----do---- | C |
| 7 | ----do---- | ----do---- | C |
| 8 | ----do---- | ----do---- | C |
| 9 | Black | ----do---- | C |
| 10 | Blackish brown | ----do---- | C |
| 11 | ----do---- | ----do---- | A |
| 12 | ----do---- | ----do---- | C |
| 13 | Yellowish green | ----do---- | A |
| 14 | Dark green | ----do---- | A |
| 15 | ----do---- | ----do---- | C |
| 16 | Blackish brown | ----do---- | B |
| 17 | Light yellow | ----do---- | C |
| 18 | Yellowish green | Asp. oryzae TPR-18 | A |
| 19 | Blackish purple | Aspergillus sp | C |
| 20 | Black | ----do---- | C |
| 21 | Yellowish green | ----do---- | A |
| 22 | Blackish purple | ----do---- | C |
| 24 | ----do---- | ----do---- | C |
| 25 | ----do---- | ----do---- | C |
| 26 | Blackish brown | ----do---- | C |
| 27 | Black | ----do---- | A |
| 28 | Yellowish green | ----do---- | C |

See footnotes at end of table.

Table II—Continued

| Strain No. | Color of colony | Genus | Classification by activity[1] |
|---|---|---|---|
| 29 | White | Unknown | C |
| 30 | Light blue | Penicillium sp | C |
| 31 | Light yellowish green | Aspergillus sp | C |
| 32 | do | do | C |
| 33 | do | do | C |
| 34 | do | do | C |
| 36 | Black | do | B |
| 37 | Yellowish brown | do | A |
| 38 | Light yellowish brown | do | A |
| 39 | Yellow | do | C |
| 40 | Orange red | do | C |
| 48 | Black | do | C |
| 49 | Light green | do | C |
| 50 | Black | do | A |
| 51 | Green | Marufuku-mugimiso-kin | B |
| 52 | do | Marufuku-sokujo-kin I | C |
| 53 | do | Marufuku-sokujo-kin II | A |
| 54 | do | Marufuku-sokujo-kin III | C |
| 55 | do | Marufuku-komemiso-kin | C |
| 56 | do | Higuchi-miso-kin | B |
| 57 | do | Higuchi-takara-kin | B |
| 58 | Light green | Asp. oryzae OI-1 | A |
| 59 | Green | Asp. oryzae OI-2 | B |
| 60 | do | Asp. sojae IAM[2] | B |
| 61 | Yellowish brown | Asp. melleus | C |
| 62 | do | Asp. oniki IAM[2] | C |
| 63 | do | Asp. ochraceus IAM[2] | C |
| 64 | Yellowish green | Asp. flavus | B |
| 65 | Green | Asp. oryzae C-64-P | B |
| 67 | do | Asp. oryzae OI-3 | A |
| 68 | do | Asp. oryzae OI-4 | A |
| 69 | Black | Asp. niger OI-1 | B |
| 70 | do | Asp. niger OI-2 | B |
| 71 | do | Asp. niger OI-3 | C |
| TM-1 | Deep yellowish green | Aspergillus sp | A |
| K-1-B | Blackish brown | do | C |
| K-2-B | do | do | C |
| K-3-B | do | do | B |
| K-4-B | Black | do | B |
| K-4-2 | Reddish brown | do | B |
| K-5-B | Black | do | B |
| K-5-M | Light brown | do | B |
| K-6-B | Blackish brown | do | B |
| K-7-B | do | do | B |
| K-6-Y | Light yellowish green | do | C |

[1] A B C.
[2] IAM: Strain supplied by the Institute of Applied Microbiology, University of Tokyo.

14 strains belong to A-group. Each enzyme solution of these 14 strains is diluted and the limit of dilution rate in digestion is estimated (shown in Table II).

Table II.—Selection of Fungi Producing Acid-Protease in A-Group (pH 3.0, 40° C., 1 Hr.)

| Strain No. | Activity[1] | Strain No. | Activity[1] |
|---|---|---|---|
| Asp. niger (standard) | 1.0–1.5 | 36 | 1.5 |
| Asp. awamori | 0.5–1.0 | 37 | 0.5 |
| 11 | 1.0 | 53 | 3.0–4.0 |
| 13 | 1.5 | 58 | 4.0 |
| 14 | 2.5–3.0 | 59 | 1.0–2.0 |
| 18 | 4.0 | 65 | 1.5 |
| 21 | 2.5–3.0 | 67 | 3.0 |
| 27 | 1.5–2.0 | TM-1 | 1.5–2.0 |

[1] Dilution ratio of koji extract.

According to Yoshida's report (J. Agr. Chem. Soc. Japan, vol. 28, p. 66 (1954)), there are many black strains belonging to *Aspergillus niger*, but there are unexpectedly few strains which produce strong acid-protease. Some of yellow-green strains belonging to *Aspergillus oryzae*, which have been regarded to be poor in the production of acid-protease, show stronger activity, especially each strain of No. 18 and No. 58 shows always good result. No. 27 is the strongest strain among *Aspergillus niger* group.

METHOD FOR DETERMINATION OF PROTEASE ACTIVITY OF THE SELECTED STRAINS

Protease activities of 6 strains, No. 13, 18, 27, 53, 58 and 67 which are seemed to have strong protease activity in acid medium, are determined by the formal electric titration method at pH 3.0, 6.0 and 7.5.

Protease activities are determined as follows: 1 cc. of enzyme solution is added at 40° C. to 10 cc. of substrate solution which is prepared by mixing 4% milk casein solution adjusted to appointed pH with HCl or NaOH, and the same quantity of buffer solution shown in Table III and mixture is kept for one hour at 40° C. The digested mixture is added some quantity of 0.1 N-NaOH until pH becomes above 6, and in the next place is titrated electrically with 0.02 N-NaOH til pH 8.5 after addition of 5 cc. formaline adjusted to pH 8.0 with N-NaOH before use.

A blank test is carried out on the same procedure where enzyme solution is added at last, after formaline is used.

The protease activity corresponds to the different value (cc.) between original titration value and the blank test value.

Table III.—Components of Buffer Solution Used in Assay of Enzyme Activity

| pH | 0.1 N HCl | 0.1 M disodium citrate | 0.1 N NaOH | 0.2 M $H_3BO_3$, 0.2 M KCl | 0.2 M $Na_2CO_3$ |
|---|---|---|---|---|---|
| 1.0 | 10.0 | 0 | | | |
| 1.9 | 7.0 | 3.0 | | | |
| 3.0 | 6.0 | 4.0 | | | |
| 3.9 | 4.5 | 5.5 | | | |
| 4.8 | 1.0 | 9.0 | | | |
| 5.9 | | 6.0 | 4.0 | | |
| 6.7 | | 5.25 | 4.75 | | |
| 7.5 | | | | 9.5 | 5.0 |
| 8.0 | | | | 8.88 | 1.12 |
| 9.0 | | | | 6.3 | 3.7 |
| 10.0 | | | | 2.91 | 7.09 |

Table IV.—Protease Activity in Koji Extracts of Selected Strains (0.02 N NaOH Titration value (cc.), 40° C., 1 hr.)

| Strain No. pH | 13 | 18 | 27[1] | 53 | 58 | 67 | Asp. niger[1] (standard) | Awamori[1] |
|---|---|---|---|---|---|---|---|---|
| 3.0 | 7.2 | 8.8 | 7.4 | 7.1 | 8.4 | 5.7 | 5.7 | 5.9 |
| 6.0 | 10.2 | 11.1 | 2.3 | 10.6 | 11.1 | | 2.2 | 2.1 |
| 7.5 | 8.8 | 9.7 | 1.9 | 8.8 | 8.5 | | 0.2 | 0.1 |
| 3.0 | 6.4 | 8.9 | 8.0 | 6.9 | 8.0 | 6.1 | 7.3 | 5.2 |
| 6.0 | 10.9 | 12.4 | 2.5 | 9.5 | 9.7 | | 2.0 | 1.7 |
| 7.5 | 8.8 | 8.8 | 4.4 | 6.9 | 7.4 | | 0 | 0 |

[1] Strain of *Asp. niger* group.

As shown in Table IV, each protease activity of No. 27, *Aspergilus niger* and *Aspergillus awamori* belonging to genus Aspergillus is strong in acid but weak in neutral. Nos. 13, 18, 53 and 58 especially, No. 18 and No. 58 show strong protease activity not only in acid but also in neutral.

METHOD FOR THE DETERMINATION OF AMYLASE ACTIVITY OF THE SELECTED STRAINS

Amylase activities at pH 3.0 and 6.0 are determined on those strains which show strong protease activity by iodine-metric method.

To 4% soluble starch solution, adjusted to appointed pH with HCl or NaOH, add 10 cc. of soluble starch substrate containing the same quantity of buffer solution in Table III, then mixture is kept at 40° C. with shaking for one hour with addition of 0.2 cc. of enzyme solution. After one hour's digestion, add 10 cc. of 0.1 N-$I_2$ solution, and in the next place 10 cc. in case of pH 3.0 and 8 cc. in case of pH 6.0, of 0.2 N-NaOH to the digested mixture, and allow to stand for 20 minutes at room temperature. Then add 2 cc. of N-$H_2SO_4$, and free iodine is titrated with 0.1 N-$Na_2S_2O_3$ using an indicator of 0.1% soluble starch solution.

A blank test is carried out on the same procedure where enzyme solution is added at last, after addition of iodine solution.

Amylase activity corresponds to the difference between original titration value and the blank test value.

*Table V.—Amylase Activity in Koji Extracts of Selected Strains*

*(40° C., 1 Hr., 0.1 N $Na_2S_2O_3$ Titration Value (cc.))*

| Strain No. pH | 13 | 18 | 27[1] | 53 | 58 | Asp. niger [1] (standard) |
|---|---|---|---|---|---|---|
| 3.0 | 2.0 | 2.8 | 1.0 | 3.0 | 4.9 | 1.2 |
| 6.0 | 6.6 | 6.4 | 1.8 | 6.4 | 6.4 | 2.3 |

[1] Strain of *Asp. niger* group.

As shown in Table V, *Aspergillus oryzae* group has considerably strong amylase activity. There are no strains belonging to *Aspergillus niger* which show strong amylase activity.

The strains belonging to genus *Aspergillus oryzae*, Nos. 13, 18, 53 and 58 are strong on digestive activity of protein and starch in acid and neutral medium among the selected strains. Especially No. 18 is the most suitable for koji culture medium because of its ability of spore formation and its rather rapid growth.

Morphological observations upon the new strain on Czapek-agar slide-plate culture showed the facts: No perithecium; no ascospore; vesicle—sub-globose, 14.6$\mu$ x 13.4$\mu$; condiophore—rough wall, 700$\mu$ x 7$\mu$; sterigmata—single series, 9.8$\mu$ x 3.7$\mu$ and 10 sterigmata on vesicle; condiospore—globose and smooth, 3.7$\mu$; conidial head—columnar; colonies—greenish colour at first and yellow-greenish in full growth.

According to the classification method of Thom and Raper, the following characters of new strain set the new strain to be in conformity with *Aspergillus flavus-oryzae* group. But there is no strain illustrated in the manual of Thom and Raper which agrees with the new strain.

(1) No perithecium, no ascospore
(2) Vesicle—sub-globose
(3) Colonies—greenish colour at first
(4) Conidiophore—rough
(5) Colonies—yellow-greenish in full growth And according to the Sakaguchi-Yamada's classification of Japanese yellow Aspergilli, the following characters set the new strain to be in conformity with *Aspergillus oryzae*.

(1) Conidiospore has no spinule, and is globose and smooth—the strain does not belong to *Aspergillus sojae*, but belongs to *Aspergillus flavus-oryzae* in accordance with Thom and Raper, and also to *Aspergillus oryzae* in accordance with Sakaguchi et al.

(2) Vesicle is not globose and not so large—the strain is not in conformity with *Aspergillus oryzae* var. *globosus*.

(3) Colour of back of colonies is not orange-red—the strain is not in conformity with *Aspergillus oryzae* var. *fulvus*.

(4) Diameter of conidiospore is about 3.7$\mu$.

Even if the new strain is in conformity with *Aspergillus oryzae* by morphological observations, the characters in production of enzyme had never been found in *Aspergillus oryzae*. Namely, the new strain produces strong acid-protease and amylase. The strain is thus shown to be a new variety of *Aspergillus oryzae*.

And that the diameter of conidiospore of TPR-18 is about 3.7$\mu$, the diameter of conidiospore of *Aspergillus oryzae* var. *magnasporus* is 8–10$\mu$, the diameter of conidiospore of *Aspergillus oryzae* 6–8$\mu$, and the diameter of conidiospore of *Aspergillus oryzae* var. *microsporus* is 4–5$\mu$, shows TPR-18 to be a new strain belonging to *Aspergillus oryzae* var. *microsporus*. Then the position of new strain TPR-18 in the classification of Aspergillus was confirmed as *Aspergillus oryzae* var. *microsporus* TPR-18 by the comparison with *Aspergillus oryzae* var. *microsporus* 0–12–7 and 0–16–1 which have been cultured and filed at Applied Microorganism Institute of Tokyo University. The strains of *Aspergillus oryzae* var. *microsporus* belong under a typical type of *Aspergillus oryzae* var. *microsporus* TPR-18, were found to produce the acid stable digestive enzyme "Vernase." The result of observations of microscopic, and gigantic colony on Czapek-agar and koji-agar are following.

*Microscopical observation*

| | | TPR-18 | 0-12-7 | 0-16-1 |
|---|---|---|---|---|
| Conidiophore, length times breadth ($\mu$) | Min | 448×3.66 | 868×7.32 | 1,820×8.54. |
| | Max | 1400×11 | 2,940×14.64 | 2,660×13.42. |
| | Mean | 600–700×6–7 | 1,400–1,700×10–12. | 2,300×11.0. |
| | Wall | Rough | Rough | Rough. |
| Conidial head, length times breadth ($\mu$) | Min | 64.8×60 | 98×84 | 64×98. |
| | Max | 120×144 | 196×224 | 224×168. |
| | Mean | 70–90×60–90 | 140×110–170 | 154–180×150–180. |
| Vesicle, length times breadth ($\mu$) | Min | 12.2×13.4 | 30.5×26.8 | 18.3×14.6. |
| | Max | 14.6×18.3 | 48.8×42.7 | 30.5×35.4. |
| | Mean | 14.6×13.4 | 48.8×42.7 | 25–30×30. |
| Sterigmata, length times breadth ($\mu$) | Min | 7.32×2.44 | 9.76×3.66 | 6.1×3.66. |
| | Max | 9.76×3.66 | 10.98×4.88 | 8I54×4.88. |
| | Mean | | | 7–8×3.0–3.6. |
| Conidiospore diameter ($\mu$) | Min | 2.44 | 3.66 | 3.66. |
| | Max | 3.66 | 4.88 | 6.1. |
| | Mean | 3.66 | 4.2–4.8 | 4.88. |
| | Surface | Smooth, globose | Smooth, oval | Smooth, globose. |

Observation of Gigantic Colony

(a) CZAPEK-AGAR CULTURE

|  |  | Colony (cm.) | | Conidiospore | External appearance |
|---|---|---|---|---|---|
|  |  | Ht. | Diam. |  |  |
| 4th day | TPR-18 | 2 | 6-6.5 | 5 in single series | Dark yellow-green mycelium: rather long. |
|  | 0-12-7 | 1 | 5 | 0 | Yellow-green conidiospore: thin. |
|  | 0-16-1 | 2 | 4.8 | 3 in single series | Pale yellow-green conidiospore: thin. |
| 8th day | TPR-18 | 1-2 | Full | 9 in single series | Yellow-brown mycelium: rather reticulate. |
|  | 0-12-7 | 1 | Full | 9 in single series | Dark yellow-green mycelium: reticulate conidial head: thin and large and granular. |
|  | 0-16-1 | 1-3 | Full | 7 in single series | Umber-green mycelium: reticulate conidial head: thin and granular. |

(b) KOJI-AGAR CULTURE

|  |  | Colony (cm.) | | Conidiospore | External appearance |
|---|---|---|---|---|---|
|  |  | Ht. | Diam. |  |  |
| 3rd day | TPR-18 | 2-3 | 6 | 6 in single series | Dark yellow-green, concentric circle figure mycelium: rather long. |
|  | 0-12-7 | 1-2 | 5 | 5 in single series | Yellow-green mycelium: reticulate conidial head: thin and granular. |
|  | 0-16-1 | 1 | 4 | 4 in single series | Pale yellow-green mycelium: reticulate conidial head: thick. |
| 6th day | TPR-18 | 2-3 | 10 | 10 in single series | Dark yellow-green, long trichomata over conidiospore mycelium: thick. |
|  | 0-12-7 | 1-2 | 10 | 10 in single series | Dark yellow-green mycelium: thin and granular conidial head: rather thin. |
|  | 0-16-1 | 2 | 10 | 10 in single series | Yellow-green mycelium: rather thin. |

Furthermore we found that the enzyme from the strain shows many interesting enzymological characters. It was proved in recent years that amylase from fungi comprises α-amylase, amyloglucosidase and transglucosidase (J. Nikuni: Mem. Inst. Sci. and Ind. Research, Osaka Univ., vol. 9, p. 194 (1952), Chem. Abst., vol. 47, p. 10568 (1953). H. Okazaki: Symposia on Enzyme Chem. (in Japan), vol. 9, p. 43 (1954); K. Kitahara: J. Fermentation Technology, vol. 27, p. 254 (1949)), and that each fungus of *Aspergillus oryzae*, *Aspergillus usamii*, *Aspergillus awamori*, *Rhizopus tonkinensis* and *Rh. péka* produces the enzyme having all of three kinds of activity of α-amylase, amyloglucosidase and transglucosidase, and the starch-saccharification type of each fungus varies according to the constituent ratio of the above three enzymes.

Figure 1:
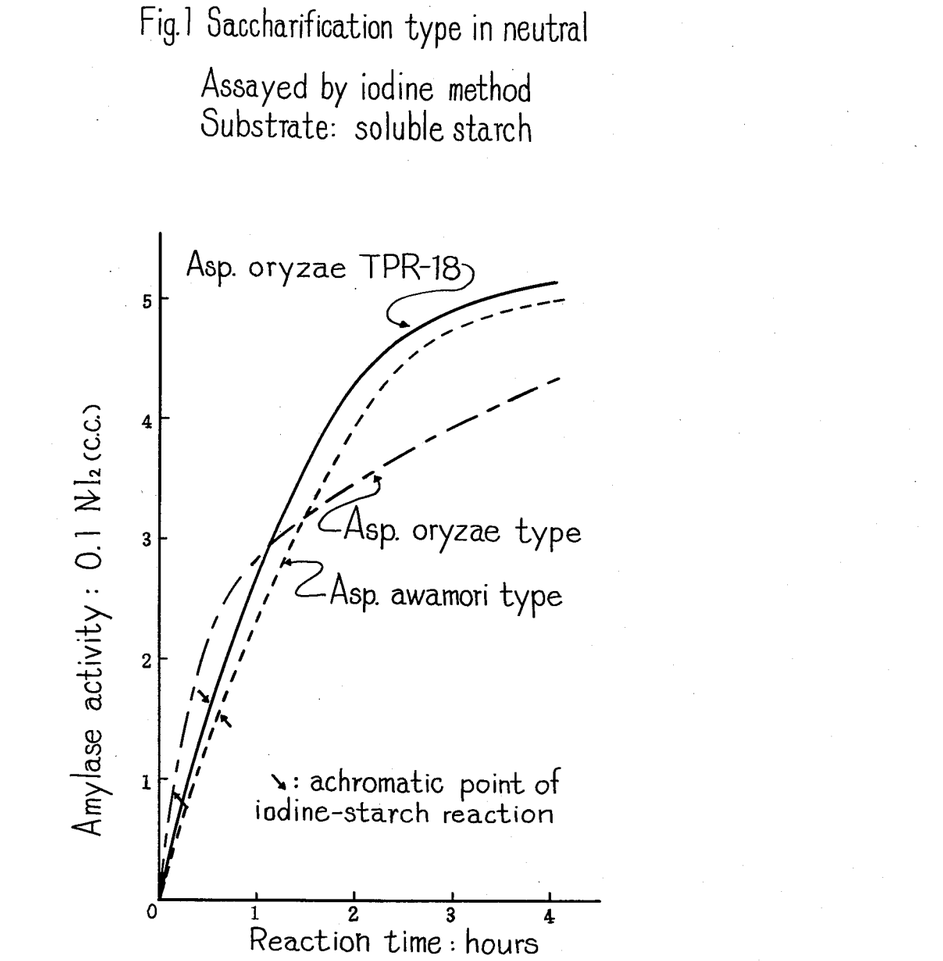
Figure 2:
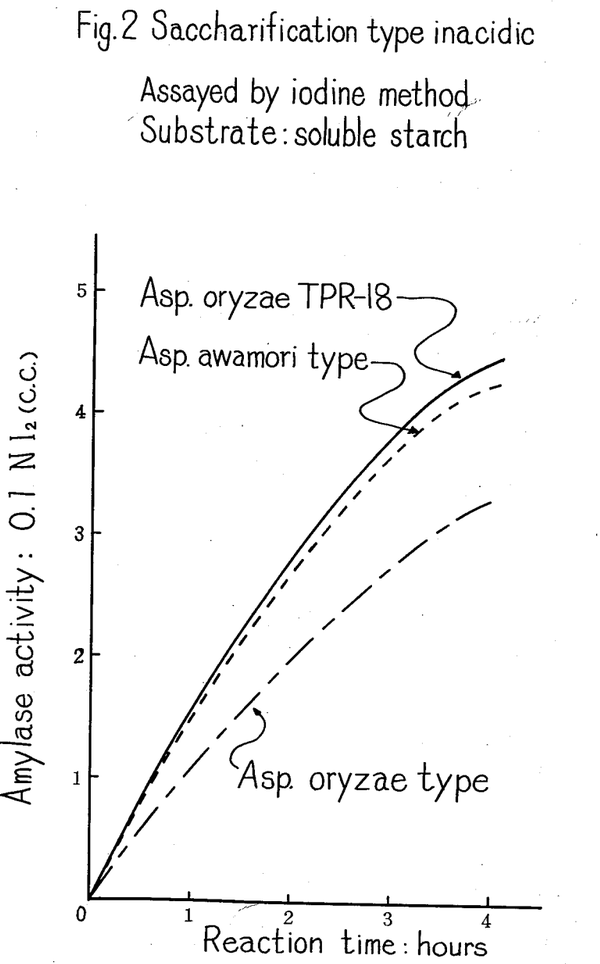

Okazaki (H. Okazaki: J. Agr. Chem. Soc. (in Japan), vol. 24, p. 88 (1950), Chem. Abst., vol. 45, p. 9115 (1951)) reported that five saccharification types were observed in fungi, and then according to his another report (H. Okazaki: Arch. Biochem. and Biophys., vol. 63, p. 322 (1956) Chem. Abst., vol. 50, p. 13652 (1956)), *Aspergillus oryzae* produces a large quantity of α-amylase so that the saccharification rate increases in the early stage and does not increase with lapse of time. In general, amylolytic action of *Aspergillus oryzae* enzyme and *Aspergillus oryzae* var. *microsporus* enzyme were poor in the medium below pH 3, because amyloglucosidase is acid-stable and α-amylase is not. As a result of our investigation, the new strain isolated from nature belongs to *Aspergillus oryzae* var. *microsporus* in morphology but in neutral medium shows the saccharification type behavior similar to *Aspergillus awamori* type as shown in FIG. 1 and in acid medium the enzyme digests starch stronger than the ordinary *Aspergillus oryzae* enzyme does, as shown in FIG. 2.

In 1954, Yoshida (F. Yoshida: J. Agr. Chem. Soc., Japan, vol. 28, p. 66 (1954)) reported that optimum pH for the activity of protease is found to be near pH 6.5 for yellow-greenish Aspergilli such as *Aspergillus oryzae* and pH 2.5 for blackish Aspergilli such as *Aspergillus niger*, on the ground of the determination of proteolytic activities of various Aspergillus enzymes obtained from wheat bran koji extracts. In 1955, Kageyama observed (K. Kageyama: J. Fermentation Technology, vol. 33, p. 109 (1955), Chem. Abst., vol. 49, p. 13589 (1955)) that strains of *Aspergillus oryzae* produce mainly acid active protease from rice-koji, but even the same strains produce alkaline active protease from wheat bran koji.

Figure 3:
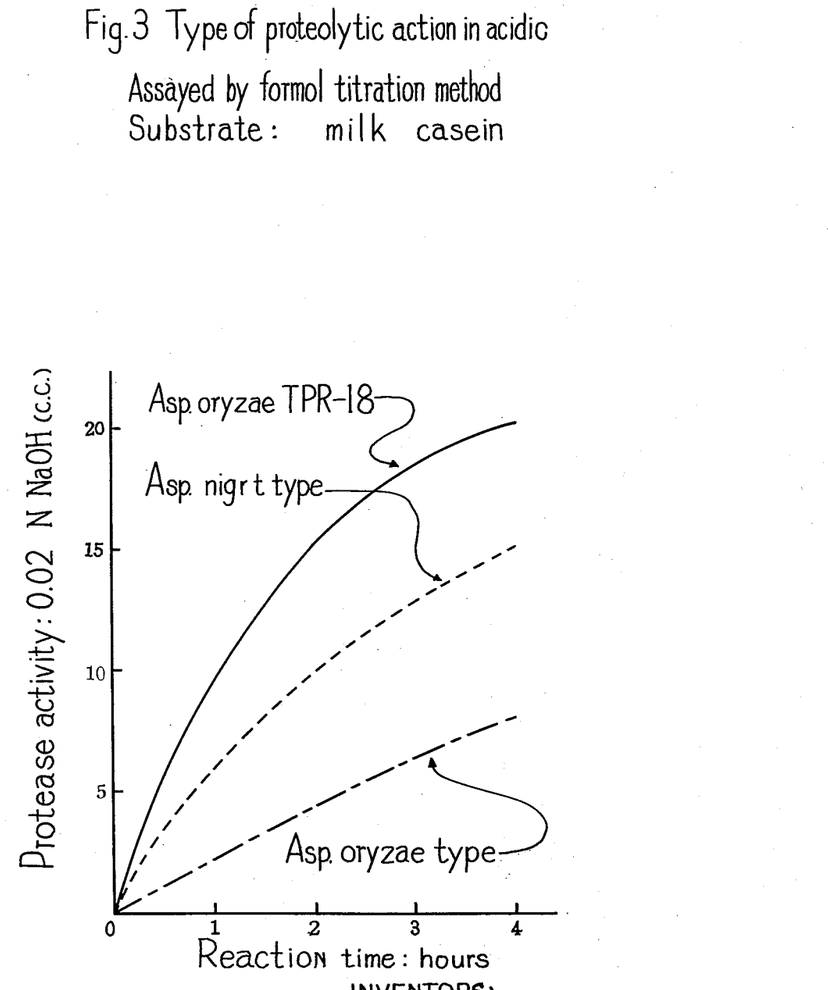
Figure 4:
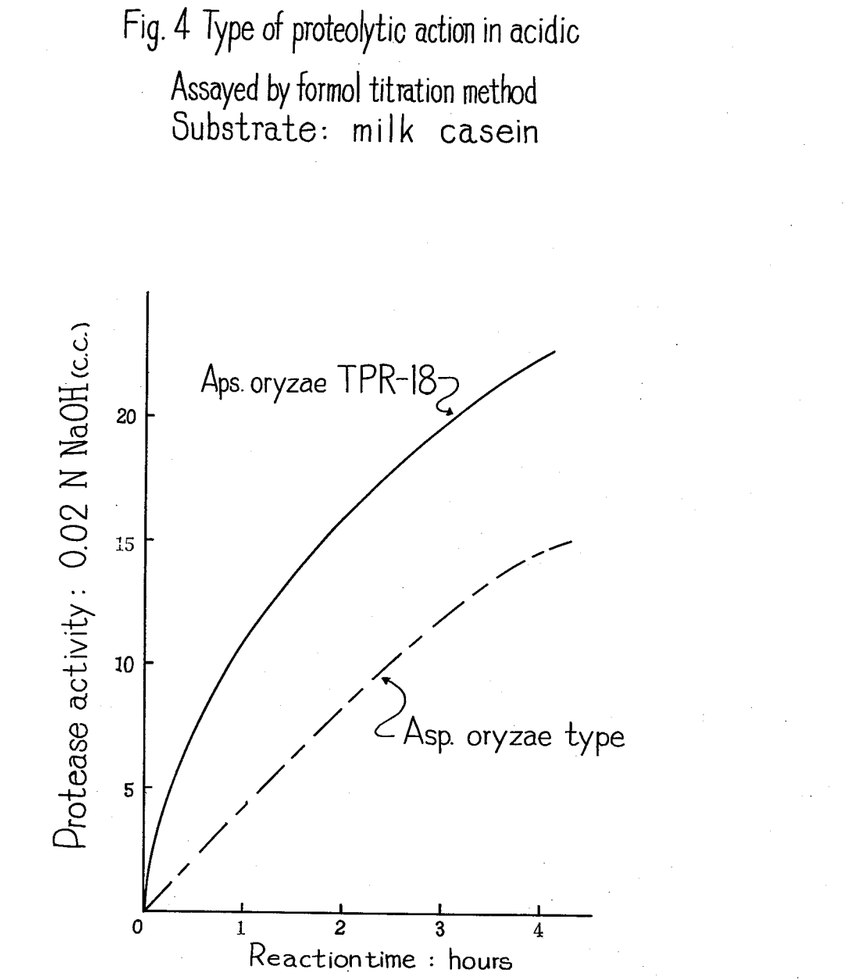

As aforementioned, from wheat bran koji, strains of *Aspergillus oryzae* group produce generally alkaline active protease and *Aspergillus niger* group acid active protease. But we discovered the new fact that the enzyme of our isolated strain in accordance with this invention contains strong acid active protease in addition to neutral medium active protease as shown in FIGS. 3 and 4.

By the above mentioned facts namely the classifical research in morphological studies and in studies of characteristic behaviour in enzymology, our discovered strain was recognized as a new strain among *Aspergillus oryzae* and was named *Aspergillus oryzae* var. *microsporus* TPR-18.

The second step in the research was to determine the optimum conditions of medium and culture process which enables *Aspergillus oryzae* var. *microsporus* TPR-18 to grow enough to obtain a sufficient quantity of acid-stable enzyme. Each material such as wheat bran, oil cake, soya bean cake and copra meal, was employed for the culture medium and one of them, wheat bran was the most suitable for the purpose, and moreover, it was found that the yield of acid active protease increases by addition of a small amount of acid to the culture medium.

The culture medium to be employed was first suitably moistened with 0.2 N HCl corresponding to 20–50% weight of wheat bran and then was sterilized for 1–2 hours at 100° C. Allowed to cool after sterilization, it was inoculated with the fungus seed spores. The culture was continued for 40–50 hours at 30° C.

At the third step in the research, we investigated the process of making the acid-stable enzyme produced by *Aspergillus oryzae* var. *microsporus* TPR–18, in the respect of cost and convenience.

Stabilization of enzyme solution was made by addition of zinc chloride and cobalt chloride.

The procedure was the following: the culture medium propagated *Aspergillus oryzae* var. *microsporus* TPR–18 sufficiently was extracted with water, and then the extract, to which zinc chloride or cobalt chloride was added in a concentration of $10^{-3}$ mol., was adjusted at the stable acidity in the range of pH 5–6, and evaporated in vacuo at 30° C. until half volume of the extract. In above procedure, the enzyme was kept stable during condensation of the extract in the presence of zinc chloride or cobalt chloride, and the decreased volume of the extract solution made the following procedure convenient both in operation and in material consumption.

In the present invention zinc chloride and cobalt chloride are used as stabilizer for the enzyme to prevent destroying of activity during the condensation of the enzyme extract. It has been found by inventors that zinc and cobalt salts help to preserve the enzyme stable to heat.

In the next procedure to precipitate the enzyme, to the concentrated extract solution, one and a half volume of isopropanol was added and thus precipitated enzyme was dried in vacuo after centrifugation. This product was named "Vernase."

Ethanol has been used to precipitate the enzyme from the water extract of koji. In the present invention, isopropanol is used instead of ethanol.

R. L. Gates and E. Kneen had reported (Cereal Chem. 25, No. 1, pp. 1–18) that they had precipitated amylase from the amylase containing water extract by addition of isopropanol instead of ethanol. But they had not reported the activity and yield of obtained amylase against the ethanol method. Inventors have found that in the case of protease isopropanol can be used good enough or rather good instead of ethanol. For example, the following table shows the comparison between ethanol and isopropanol methods.

| Method | Yield | Protease activity | | |
|---|---|---|---|---|
| | | pH 2.7 | pH 6.0 | pH 7.5 |
| Isopropanol | 114 | 4.5 | 5.3 | 4.8 |
| Ethanol | 100 | 4.0 | 5.0 | 4.2 |

Description and digestive power of the acid-stable digestive enzyme (Vernase) manufactured by these procedures are as follows:

*Description.*—Powder of very slightly grayish or brownish white, nearly inodorous, possessing characteristic taste, soluble in water and insoluble in almost organic solvents, such as alcohols, ethers and acetones.

Figure 5:
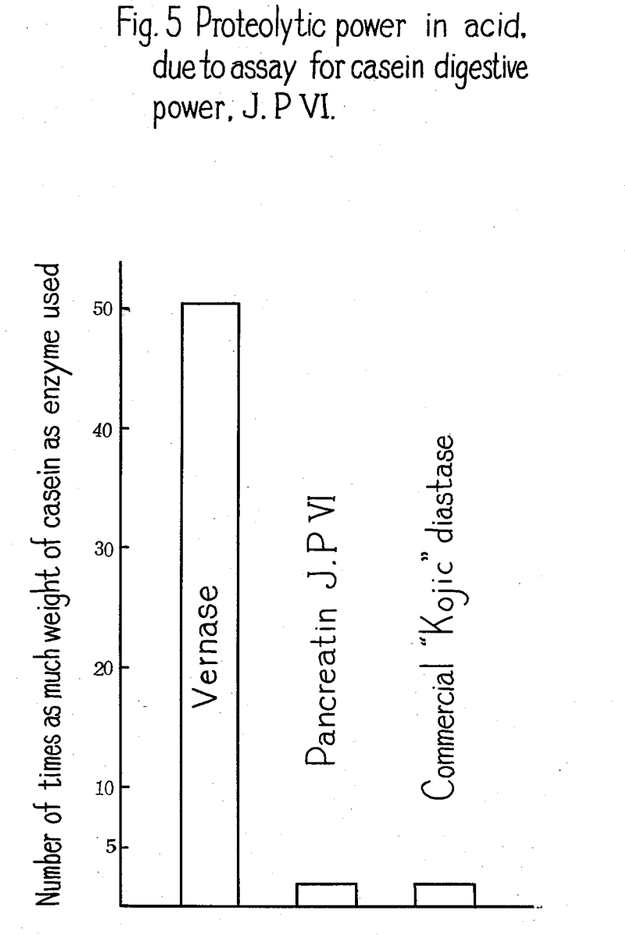
Figure 6:
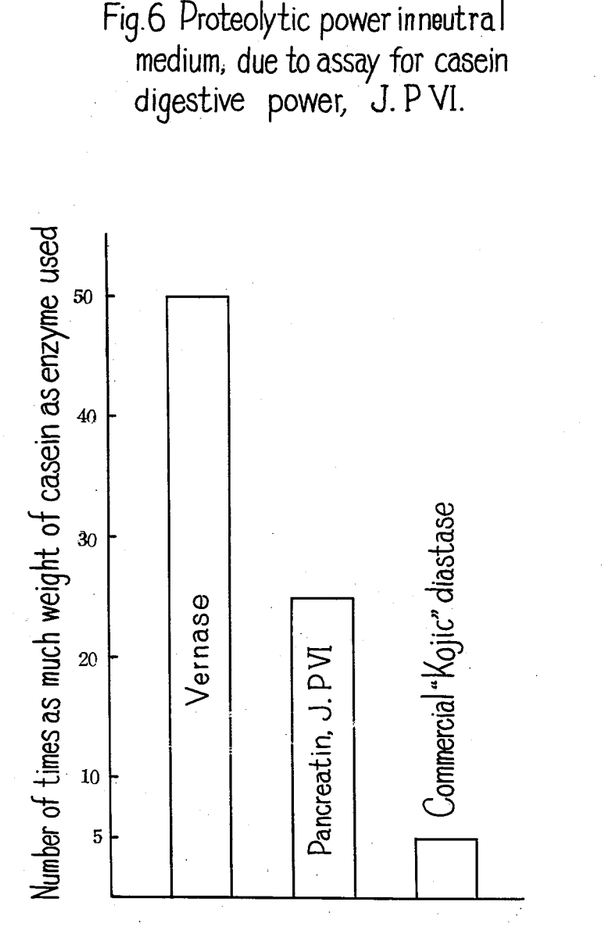
Figure 7:
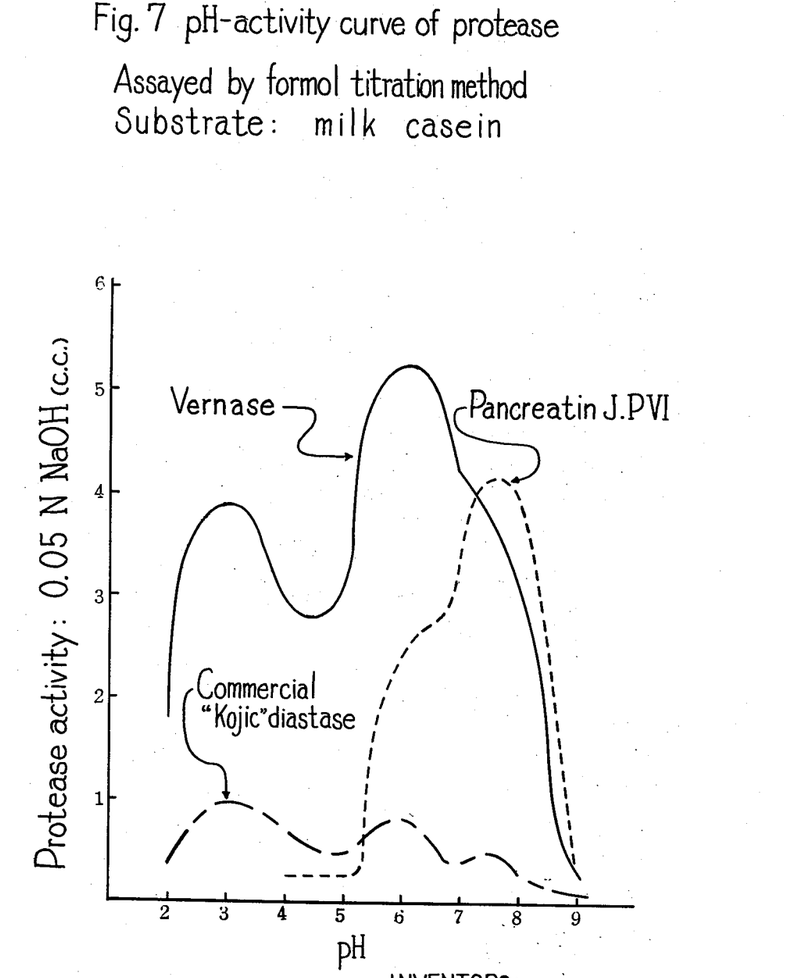

*Digestive power.*—Proteolytic power: The results of examining the proteolytic power of "Vernase" were shown in FIGS. 5 and 6. At pH 2.7 (acidic), pancreatin (J.P. VI) and commercial koji diastase (Taka-diastase, etc.) were almost inactive, whereas "Vernase" digested 50 times milk casein of its weight.

pH activity curve of protease: Digestive strength of "Vernase" at various pH was determined to find the active pH range from pH 2 to pH 8 (acidic or neutral), as shown in FIG. 7.

Amylolytic power: "Vernase" saccarified 200 times starch of its weight in acid (pH 3.9)—twice as much effect as of a commercial malt diastase (L.P. VI) at its optimum pH (ca. pH 6).

In conclusion "Vernase" is an acid-stable enzyme having both proteolytic and amylolytic actions, and has excellent characters for a digestive preparation.

*Toxicity of Vernase.*—Acute toxicity test: The acute oral toxicity test of Vernase was tested for guinea pigs (500–600 gm.).

20 guinea pigs were divided into 4 groups to which were given 20 cc. of 5.0%, 12.5%, 25.0% and 42.5% Vernase solution per 500 gm. of body weight of the animal, respectively.

As shown in the following table, neither death nor significant symptoms were observed in case of less than 8.5 gm. administration.

Macroscopically, there were no findings in the internal organs of maximum in this test of Vernase.

*Table VI.—Result of Toxicity Test*

| No. | Dose, gm. | Sex | Body weight, gm. | Time | | | |
|---|---|---|---|---|---|---|---|
| | | | | 30 min. | 1 hr. | 2 hr. | 24 hr. |
| 1 | 1.0 | ♂ | 510 | No change | No change | No change | No change. |
| 2 | | ♂ | 530 | do | do | do | Do. |
| 3 | | ♂ | 525 | do | do | do | Do. |
| 4 | | ♀ | 500 | do | do | do | Do. |
| 5 | | ♀ | 520 | do | do | do | Do. |
| 6 | 2.5 | ♂ | 530 | do | do | do | Do. |
| 7 | | ♂ | 560 | do | do | do | Do. |
| 8 | | ♂ | 520 | do | do | do | Do. |
| 9 | | ♀ | 515 | do | do | do | Do. |
| 10 | | ♀ | 530 | do | do | do | Do. |
| 11 | 5.0 | ♂ | 500 | do | do | do | Do. |
| 12 | 5.0 | ♂ | 545 | do | do | do | Do. |
| 13 | | ♂ | 535 | do | do | do | Do. |
| 14 | | ♀ | 530 | do | do | do | Do. |
| 15 | | ♀ | 515 | do | do | do | Do. |
| 16 | 8.5 | ♂ | 560 | Slight anorexia | Slight anorexia | Slight anorexia | Recovered. |
| 17 | | ♂ | 510 | do | do | do | Do. |
| 18 | | ♂ | 500 | do | d | do | Do. |
| 19 | | ♀ | 520 | do | do | do | Do. |
| 20 | | ♀ | 500 | do | do | do | Do. |

Chronic toxicity test: The easiest, commonest, yet exact method of determining toxicity of a certain drug is to examine whether its administration to growing animals will disturb their weight increase or not. By adopting this method, the chronic tests of Vernase were carried out.

*Materials and method.*—Test animals: (1) 20 rabbits, both sexes, about 1.5 kg., fed in a feeding room (temp., 24° C.; humid., 70%), 100 gm. of the solid food RC-5 and 300 cc. of water (contains 5 mg./100 cc. of vitamin C), 10 for the control group and the other 10 for the Vernase group. (2) 40 rats, both sexes, about 40–50 gm., fed in a feeding room under the same conditions, 20 gm. of the solid food MF, 25 cc. of water (contains 5 mg./100 cc. of vitamin C), 20 for the control group and the other 20 for the Vernase group.

*Administration of Vernase.*—300 mg./kg. Vernase was given to the 10 rabbits for 180 days and to the 20 rats for 90 days orally by Sonde once a day.

*Results.*—In the Vernase groups, thus after 90 and 180 days' daily administration, no death was observed and the Vernase groups showed a more marked increase of body weight rather than the control group.

No pathological changes were observed macroscopically in the internal organs of the rabbits and rats after 180 and 90 days of daily administration, respectively.

CLINICAL TEST—PART 1

[Carried out at the Ueda Department of Internal Medicine, Faculty of Medicine, Tokyo University]

In order to test its clinical efficacy and by-effects, Vernase was administered to 5 out-patients and 15 in-patients who complained of loss of appetite, apepsia and compression feeling at the gastric region after meals due to gastroptosis, chronic gastritis, anorexia, etc.

It was administered by mouth in a daily dose of 0.5 to 1.0 gm. three times a day after meals for 5 consecutive days. No other drugs were used together.

Of the 15 in-patients, appetite improved in 2 cases of chronic nephritis, 2 of chronic gastritis, 1 of emaciation after two-thirds resection of the stomach, 1 of anorexia and 1 of gastroptosis. The body weight increased by 500 to 1,100 gm. in three of them, namely in each one case of chronic nephritis, emaciation after two-thirds resection of the stomach and chronic gastritis. The remaining 8 cases, for which no good results were obtained, consisted mainly of rather serious diseases requiring some drugs besides the peptic enzyme preparation, such as myxoedema with complaints of gastric and abdominal pains, ulcerous colitis with symptoms of abdominal pains and occult blood, gastroptosis, etc. In all of the 5 out-patients Vernase was effective.

Constipation, diarrhoea, belching and nausea were developed during the application of Vernase, but these symptoms, which are related to the primary diseases, cannot be thought to have been induced definitely by Vernase.

From the above results, it follows that the daily administration by mouth of 0.5 to 1.0 gm. of Vernase is effective by itself, without the combined use of antacids, in relief of anorexia and compression feeling at the gastric region due to chronic gastritis, chronic nephritis, gastroptosis, etc.

CLINICAL TEST—PART 2

[Carried on at the Hospital of Diseases of the Digestive Organs, Tokyo]

The administration of Vernase was tried for chronic gastroenteritis complicated by gastroptosis, dyspepsia, gastroptosis, diarrhoea after resection of the stomach or gall bladder, and distended abdomen at the hypogastric region. In this test Vernase was administered in combination with other drugs because those diseases are all not due to simple lack of the peptic enzyme.

Chronic gastroenteritis complicated by gastroptosis (21 cases): Vernase was administered in a daily dose of 0.8 to 1.5 gm. in combination with calcium carbonicum praecipitatum, Adsorbin, CMC, sodium bromide, tinctura strychni, etc. Diarrhoea and distended abdomen at the hypogastric region disappeared completely in 10 cases, recurred after a temporary improvement in 5 cases, and remained unimproved in one case.

Gastroptosis (7 cases): Vernase was administered in a daily dose of 1.0 to 2.0 gm. combined with sodium bromide and extractum strychni. Anorexia and soft stool improved in 5 cases, recurred after a temporary improvement in one case, and remained unimproved in one case. Some of those patients who could be relieved of anorexia, but not of soft stool by sodium bicarbonicum, extractum scopoliae, CMC, sodium bromide, tinctura strychni, etc. turned better by use of Vernase.

So-called dyspepsia (9 cases of gastroptosis complicated by chronic enteritis of children): The dose of Vernase administered and the drug used in combination are the same as those in 1. Diarrhoea and soft stool improved completely in 4 cases, recurred after a temporary improvement in 4 cases, and remained unimproved in one case.

Diarrhoea and distended abdomen at the hypogastric region after resection of the stomach (5 cases), Vernase was administered in a daily dose of 1.5 gm. in combination with calcium carbonicum praecipitatum, sodium bicarbonicum and extractum scopoliae.

Marked improvement was observed in 3 cases, relief of the symptoms after a few days in one case, and no improvement in one case where diarrhoea had continued since before the resection of the stomach.

As various kinds of drugs were used in combination besides Vernase in the test, the good effect brought about cannot be attributed only to Vernase, but the effect of Vernase must not be neglected because complete healing was sometimes induced only after administering Vernase to those patients who could not be cured by other drugs than Vernase. No harmful by-effects were experienced due to Vernase.

STUDY ON THE EFFECT OF VERNASE ON THE DIGESTIVE ACTIVITY OF GASTRIC JUICES

[Carried on at the Hospital for Diseases of the Digestive Organs, Tokyo]

The gastric juice test is generally performed on the samples taken by the Katsch-Kalk method. The acidity of the gastric juice thus obtained is pH 1.5 to 2.2 in healthy persons and 3.0 to 7.0 in achlorhydric or hypochlorhydric patients. These values of acidity are, however, no other than those shown by the gastric juice secreted by the stimulation of caffeine, and not of the gastric juice from an empty or working stomach. According to Henning[1] and Iinuma,[2] the acidity at an empty stomach is lower than pH 2.5 in about 80% of normochlorhydric persons, and that of a working stomach stands at pH 4–5, 30 minutes after meal, 2–4.5 between 30 and 60 minutes after meal, and 1.5–2 after the completion of digestion. Accordingly, the peptic enzyme preparations effective even in the absence of ant-acids are those capable to act at pH 2 to 2.5.

To elucidate the peptic action of Vernase in the stomach, reduced sugar and tyrosine were determined which were produced by Vernase from the solutions of soluble starch or powdered milk added to the gastric juices with a pH range of 2 to 8 sampled by the Katsch-Kalk method. Buffer solutions were not used in the study.

Action as a protease:
  Substrate: 0.5 ml. of a 30 gm./dl. solution of powdered milk
  Gastric juice: 5 ml. of the supernatant after centrifugation
  Vernase and other enzyme preparations: each 1 ml. of the 500 mg./dl. solution
  Incubation conditions: 1 hr. at 40° C.

After the completion of the incubation, tyrosine produced was determined by measuring the optical density of the colour developed by adding 10 ml. of 0.55 M $Na_2CO_3$ solution and 2 ml. of the Folin's phenol reagent to 2 ml. of the filtrate obtained from the mixture of the solution incubated with 10 ml. of 0.5 N sulfuric acid solution containing 0.25 M trichloracetic acid and 0.5% phosphowolframic acid.

As shown in Table VII, Vernase was strongly active at pH 2 to 5, which is the acidity shown by a working stomach. The gastric juices of the same pH show variable protease activity, but it was found that Vernase could reinforce the gastric juice more strongly than other enzyme preparations when its protease activity is weak.

Action as an amylase:
  Substrate: 4 ml. of a 5% solution of soluble starch
  Gastric juice: 6 ml. of the supernatant after centrifugation
  Vernase and other enzyme preparations: each 1 ml. of the 200 ml./dl. solution
  Incubation conditions: 1 hr. at 40° C.

After the completion of the incubation, reduced sugar produced was determined as glucose by the iodine method.

As shown in Table VIII, the amylase activity, which might be ascribed to saliva, was prominent and the activity of the peptic enzymes added was not certain in the gastric juices of pH higher than 4.5, whereas the amylase activity due to salvia disappeared and the action of Vernase added became manifested in the gastric juices of pH lower than 4, especially more clearly in those of pH lower than 3.5 than that of the other enzyme preparations.

From the above results it follows that Vernase is capable of digesting protein and starch in the stomach even if antacids are not used together.

---

[1] Henning: Med. Klin., 54(4): 140–143, 1959.
[2] Iinuma: addressed at the 13th General Assembly of the Pharmaceutical Society of Japan in Tokyo.

Table VII.—Mg. of Tyrosine Produced

| pH of gastric juice | (1) | (2) | (3) | (4) | (5) | (6) | (7) |
|---|---|---|---|---|---|---|---|
| 1.62 | 283 | 325 | 102 | 336 | 53 | | |
| 1.67 | 311 | 408 | 97 | 336 | 25 | | |
| 2.20 | 214 | 439 | 225 | 269 | 55 | 233 | |
| 2.90 | 325 | 528 | 213 | 325 | 10 | 325 | 19 |
| 2.93 | 185 | 526 | 251 | 309 | 123 | | 0 |
| 3.40 | 206 | 631 | 425 | 384 | 178 | 310 | 104 |
| 4.10 | 98 | 474 | 376 | 219 | 121 | | |
| 5.10 | 57 | 387 | 320 | 265 | 208 | 217 | 160 |
| 5.70 | 38 | 447 | 409 | 177 | 139 | 111 | 73 |
| 6.10 | 37 | 385 | 348 | 105 | 71 | 151 | 114 |
| 7.38 | 180 | 277 | .97 | | | | |
| 8.00 | 523 | 697 | 164 | | | | |
| 8.00 | 29 | 426 | 407 | 80 | 51 | 128 | 99 |
| 8.20 | 252 | 464 | 212 | 431 | 179 | 437 | 185 |

Table VIII.—Mg. of Glucose Produced

| pH of gastric juice | (1) | (2) | (4) | (6) | (8) |
|---|---|---|---|---|---|
| 2.00 | 0 | 2.7 | 0 | 0 | 0 |
| 2.20 | 0 | 9.0 | 0.9 | 0.9 | 0 |
| 2.93 | 0 | 18.9 | 1.8 | 2.7 | 5.4 |
| 3.40 | 0 | 37.8 | 3.6 | 0 | 29.7 |
| 4.10 | 0 | 38.8 | 10.5 | 1.7 | 38.6 |
| 4.54 | 51.8 | 57.6 | 50.9 | | 63.9 |
| 5.28 | 59.2 | 55.4 | | | |
| 6.38 | 45.0 | 44.6 | | 45.9 | 45.9 |
| 7.90 | 41.9 | 43.7 | | 43.2 | 40.1 |

[1] Gastric juice, 5 ml.   [2] Vernase, 5 mg. plus gastric juice, 5 ml.
[3] Vernase, 5 mg.   [4] Koji-diastase, 5 mg. plus gastric juice, 5 ml.
[5] Koji-diastase, 5 mg.   [6] JP VI, pancreatine plus gastric juice, 5 ml.
[7] JP VI, pancreatine.   [8] Taka-diastase plus gastric juice, 5 ml.

"Studies on the Proteolytic Enzyme of Black Aspergilli," described in "Proceeding of the International Symposium on Enzyme Chemistry, Tokyo and Kyoto," by Yoshida et al., relates to the acid-stable proteolytic enzymes obtained from black Aspergilli and does not relate to the acid-stable proteolytic enzymes obtained from yellow-green Aspergilli such as *Aspergillus flavus-oryzae* group. Moreover, F. Yoshida had answered to a question as follows: "Our enzyme is unstable at neutrality." The enzyme from the new strain is stable at neutrality.

Chemical Abstracts, vol. 49, 13589, article by Kageyama et al., 1955. The original literature for it is "Studies on *Aspergillus oryzae* of Rice-Koji (2), Properties of Protease in Rice-Koji by Kimio Kageyama" (J. Fermentation Technology, vol. 33, No. 2, 1955, p. 5) and its literature in Japanese is in Jyozo Gakukai-shi, vol. 33, pp. 53–59.

In above studies they had presented that:

The protease obtained from wheat bran koji of yellow Aspergillus (*Aspergillus oryzae*) is alkaline protease, its optimum pH is between 7–9. But from rice-koji, acid-protease (optimum pH 2–4) and alkaline protease (optimum pH 7–9) are obtained. The alkaline protease system shows a strong activity in casein digestion at pH 7.0–7.5, but cannot act at pH less than 3.0. On the contrary, the acid protease system exerts a strong hydrolytic action upon casein at pH 2.8–3.0, but cannot act at all under alkaline condition.

Even if each of former references states the production of acid-stable proteolytic enzymes by Aspergilli, in these cases enzymes are obtained from black Aspergilli or from rice-koji of yellow Aspergilli. And there is nothing to state the production of the acid-stable proteolytic enzymes from wheat bran koji of yellow-green Aspergilli. The present invention relates really to that the production of an acid-stable proteolytic and amylolytic enzyme from wheat bran koji of a new strain, *Aspergillus oryzae* var. *microsporus* TPR–18.

Our invention will be better understood by referring to the following examples in which the preparation of the acid stable proteolytic and amylolytic enzyme from *Aspergillus oryzae* var. *microsporus* TPR–18 is described.

ISOLATION OF *ASPERGILLUS ORYZAE* VAR. *MICROSPORUS* TPR–18

Many fungi were isolated from nature (atmosphere, fruits, vegetables). The fungi from them were propagated at 30° C. on koji-agar plate adjusting medium adjusted to pH 3 with HCl. And then 71 strains of blackish Aspergilli such as *Aspergillus niger*, 64 of yellow-greenish Aspergilli such as *Aspergillus oryzae*, 8 of yellow-brownish Aspergilli such as *Aspergillus ochraceus*, 1 of Penicillium and etc., was tested—totaling 167 strains.

As a result of determining their proteolytic and amylolytic power, we discovered a new strain, *Aspergillus oryzae* var. *microsporus* TPR–18 producing strong acid active, neutral medium active protease and acid-stable amylase in the group cultured from the atmosphere in the suburbs of Tokyo city near River Tama.

The new strain was examined for the activity of the enzyme obtained from the acidic wheat-bran koji for seven generations. And so it was proved that the new strain, *Aspergillus oryzae* var. *microsporus* TPR–18 was fixed.

*Aspergillus oryzae* var. *microsporus* TPR–18 has been deposited in Applied Microorganism Institute of Tokyo University as 1AM2800, and ATCC No. 14156 has been assigned by American Type Culture Collection, Washington, D.C., to a culture of this microorganism.

PROCEDURE OF MANUFACTURING THE ACID-STABLE DIGESTIVE ENZYME 10 kg. of wheat bran were mixed with 5 kg. of 0.2 N HCl and then sterilized for 2 hours at 100° C., and then allowed to cool down to about 30° C. The medium so prepared is inoculated with 100 gm. of *Aspergillus oryzae* var. *microsporus* TPR–18 seed spores. These koji were divided and bedded up on sterilized trays and maintained in incubator (MURO) at 25° C.–30° C.

At the first stage of propagation, the koji was placed in 100% relative humidity and stirred for 10–15 hours after sowing and then dried after the lapse of a further 24 hours from stirring process and taken out from the incubator, in total about 50 hours.

The koji were soaked completely in 30 kg. water for 2 hours, and filtered by the press. The filtrate was centrifuged and 26 liters of clear enzyme solution was obtained.

6.2 gm. of cobalt chloride was added to the enzyme solution which was adjusted to range of pH 5–6 with acetic acid or sodium acetate and evaporated in vacuo until 14 liters at 30° C.

The concentrated solution was cooled to 0° C. by refrigerator. 21 liters of 99% isopropanol cooled previously, was poured slowly into the enzyme solution. The precipitate so formed was centrifuged and washed with 1 liter of isopropanol in a mixer and collected and dried in vacuum dryer. Yield of the enzyme was 405 grams.

We claim:

1. A process for the production of a combined proteolytic and amylolytic enzyme which is stable to strong acids, which comprises propagating *Aspergillus oryzae* var. *microsporus* TPR–18 on acidic wheat bran koji, extracting the resulting enzyme from the koji with water, adding enzyme stabilizer to the aqueous extract, concentrating the latter, and precipitating the acid-stable digestive enzyme by the addition of alcohol.

2. A process according to claim 1, wherein the acidic wheat bran koji is prepared by spraying 0.2 normal hydrochloric acid on to the koji in an amount from 20 to 50 percent of the weight of the latter, and then sterilizing the resulting product.

3. A process according to claim 1, wherein the enzyme stabilizer is a member selected from the group consisting of zinc chloride and cobalt chloride and is added to the extract in a concentration of $10^{-3}$ mol, after which the extract is adjusted to pH 5 to 6.

4. An acid-stable digestive *Aspergillus oryzae* var. *microsporus* TPR-18 combined proteolytic and amylolytic enzyme, being a powder of grayish to brownish white color substantially free from odor, soluble in water and insoluble in alcohol, ether and acetone, capable of digesting milk casein in an amount over 25 times its weight at both pH 2.7 and pH 6, and capable of saccharifying 200 times its weight of starch at pH 3.9.

References Cited in the file of this patent
UNITED STATES PATENTS
2,848,371 Yoshida ______________ Aug. 19, 1958

OTHER REFERENCES

Proceedings of The International Symposium on Enzyme Chemistry, Tokyo and Kyoto, 1957, article by Yoshida et al., pp. 504–509, publ. 1958, Maruzen, Tokyo, QP 601 15.

Chemical Abstracts, vol. 49, 13589, article by Kageyama et al., 1955.